US009064366B1

(12) United States Patent
Folk et al.

(10) Patent No.: US 9,064,366 B1
(45) Date of Patent: Jun. 23, 2015

(54) BLIND WITHDRAWAL FOR TRANSPORTATION

(75) Inventors: Amy Baker Folk, Charlotte, NC (US); William Thomas Sanders, Denver, NC (US); Daniel Christopher Bohen, Charlotte, NC (US); Shane Anthony Johnson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1652 days.

(21) Appl. No.: 12/212,453

(22) Filed: Sep. 17, 2008

(51) Int. Cl.
*G06Q 40/00* (2012.01)
*G07F 19/00* (2006.01)

(52) U.S. Cl.
CPC .................................... *G07F 19/20* (2013.01)

(58) Field of Classification Search
USPC ........................................................ 235/379
See application file for complete search history.

(56) References Cited

U.S. PATENT DOCUMENTS

| | | | | |
|---|---|---|---|---|
| 5,321,242 | A | 6/1994 | Heath, Jr. | |
| 5,451,757 | A | 9/1995 | Heath, Jr. | |
| 6,328,149 | B1 | 12/2001 | Blad et al. | |
| 6,523,742 | B1 | 2/2003 | Awatsu et al. | |
| 7,347,358 | B2 | 3/2008 | Ireland et al. | |
| 2004/0016796 | A1* | 1/2004 | Hanna et al. | 235/375 |
| 2005/0017066 | A1 | 1/2005 | Carter | |
| 2007/0063016 | A1 | 3/2007 | Myatt et al. | |
| 2007/0228152 | A1 | 10/2007 | Washington et al. | |
| 2008/0223930 | A1* | 9/2008 | Rolland et al. | 235/385 |

* cited by examiner

*Primary Examiner* — Rafferty Kelly
(74) *Attorney, Agent, or Firm* — Banner & Witcoff, Ltd.; Michael A. Springs

(57) ABSTRACT

Methods and devices provide for blind withdrawal of currency for transportation. A cash handling device may allow a selection for transport withdrawal. The user need not know the amount to be requested for dispensation. At least a portion of the currency in the cashing handling device may be stored in the container. The container may have an identifier (e.g., a barcode, an RFID tag, and the like) on it. The identifier may be stored in a database along with the amount of currency in the container. The database may be stored locally in the cashing handling device or in remote location. At a location to which the container is being delivered, the identifier may be read and used to lookup in the database the amount of currency in the container. The currency in the container may be counted and compared to the amount stored in the database for the identifier.

16 Claims, 6 Drawing Sheets

BLIND WITHDRAWAL FOR TRANSPORTATION

BACKGROUND

Oftentimes bags are used by clients (e.g., retailers) to transfer money to banks or for banks to transfer money to other facilities. These bags of currency are often marked with indicia on the bag that may identify the contents of the bag, the denominations of currency in the bag, and/or the amount of currency in the bag. In addition, if the client was not preparing the bag itself, then the carrier would normally have to know an amount to extract and put in the bag. Further, senders and/or receivers of the bags may need to verify the contents of the bag prior to shipment or upon delivery and thus "sign off" on whether the contents of the bag are correct. This can create safety risks and increase the risk of theft because bags of higher value (e.g., bags containing more money are identified clearly on the front of the bag).

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In accordance with various embodiments of the present invention, methods and devices can provide for a blind withdrawal of currency for transportation.

In one embodiment, a container (e.g., a bag, case, box, and the like) containing an amount of currency may be provided. Indicia on the container may be correlated to the amount of currency in the container. The indicia may be read from the container. The indicia on the container may be used to identify the amount of currency in the container. The container preferably does not have the amount of the currency contained therein printed on the container.

In another embodiment, reading of the indicia may be performed electronically such as, for example, by scanning a barcode, reading an RFID tag/label, scanning and performing optical character recognition on numeric, alpha, or alphanumeric characters on the container, and the like.

In yet another embodiment, the amount of currency contained in the container may be correlated in memory or in a database in memory along with the indicia on the container. The memory or database may be stored locally, in a central location, or some other remote location.

In still another embodiment, the amount of currency contained in the container and the indicia on the container may be transmitted to a central location or a remote location.

In another embodiment, a selection on a recycler may be made for transport withdrawal. At least a portion of the currency in the recycler may be stored in a container after said transport withdrawal has been selected. The container may have an identifier on it, but will preferably not state thereon the amount of the currency in the container. The identifier for the container along with the amount of the currency in the container may be stored in a database. The database may be local, centralized, accessible via a network, or remote. The container containing the currency may be removed from the recycler. In other embodiments, the user may not need to know the amount they need to extract. The cash handling device/controller may calculate the amount, count out that amount, and provide receipt/verification of said amount. The receipt/verification may be a paper receipt, manifest, RFID, bar code, or other identifier.

In still another embodiment, the bag of the currency can be delivered to a second location. The identifier on the bag may be electronically read. Alternatively, indicia on the bag may be manually read and manually input into a system. The identified may then be used in order to lookup in the database the amount of currency in the bag.

In yet another embodiment, the currency in the bag that is delivered may be counted. The counted currency may be compared with the amount stored in the database in order to verify that none of the currency was stolen.

In addition, the foregoing embodiments can be implemented in an apparatus that includes a processor for executing computer executable instructions, memory that stores the computer executable instructions, an input means for receiving user input, a display for displaying notifications and messages to the user, a printer for printing receipts, and a communication interface in order to communicate with remote locations. Each of the above-identified method steps can be implemented as computer-executable instructions that are stored in the memory and executed by the processor.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing blind withdrawal of currency for transportation.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
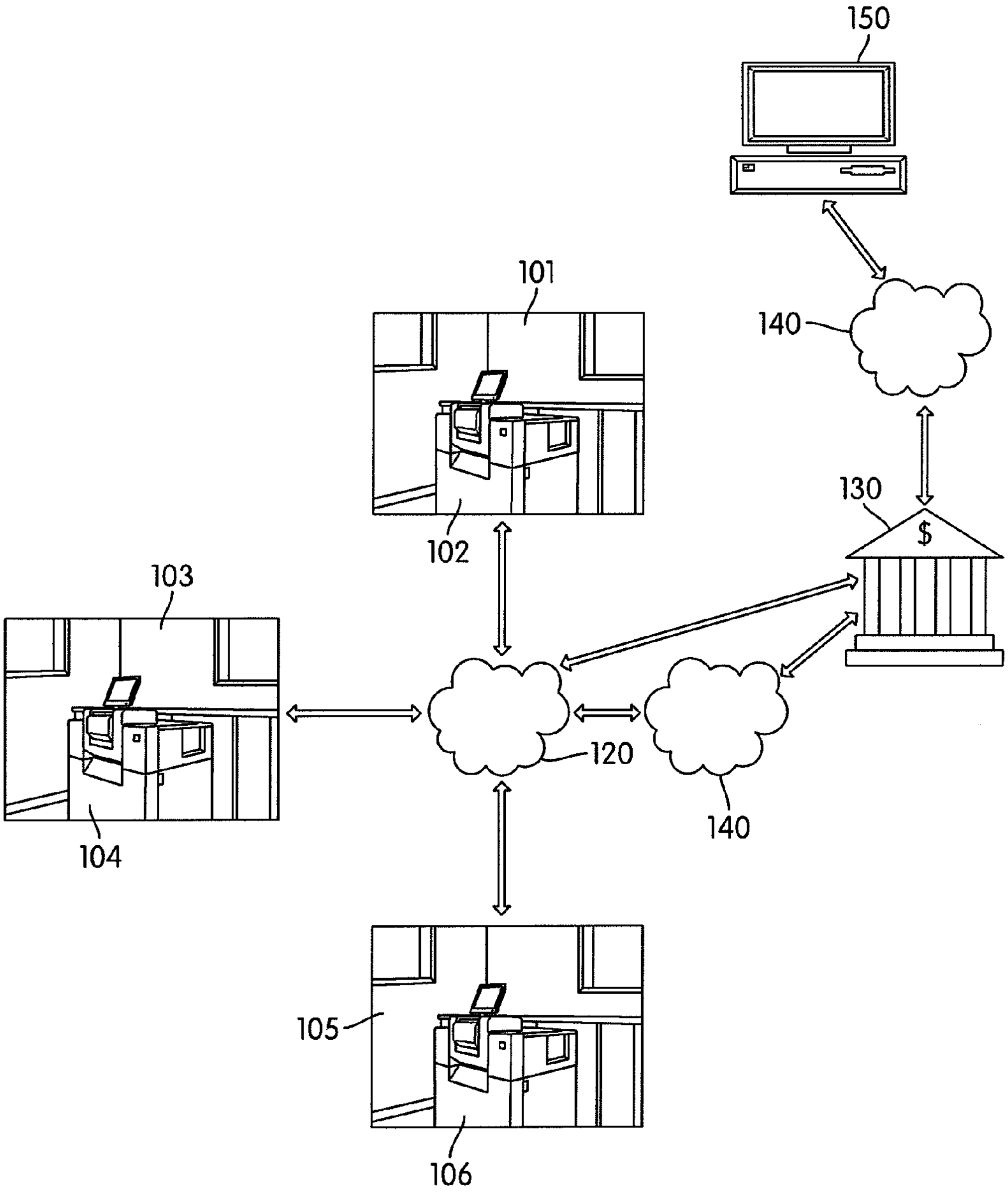
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 before being connected to bank 130. According to one or more arrangements, bank 130 may utilize an infrastructure which includes a server 150 having components such as a memory, a processor, a display, and a communication interface.

Figure 2:
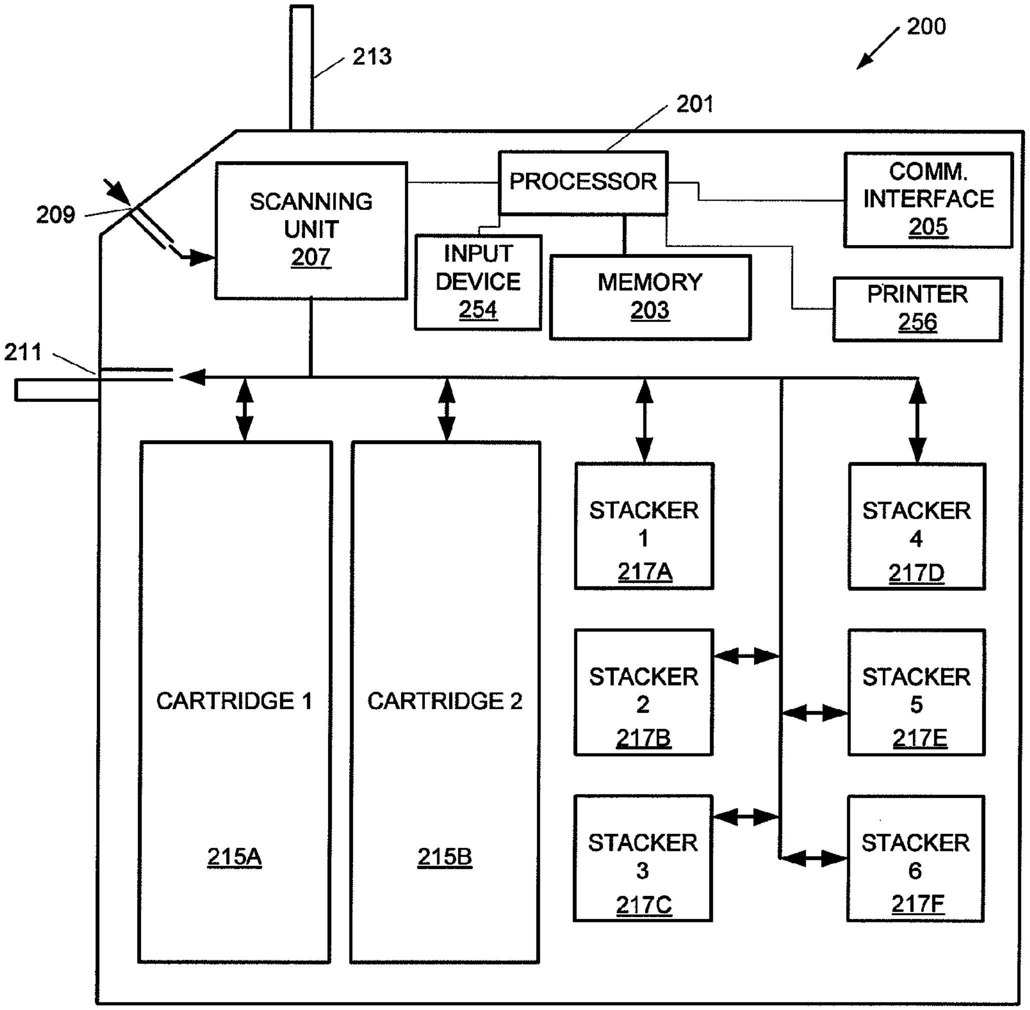
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

Input device(s) 252 may provide functionality for reading indicia stored on containers (e.g., bags, boxes, cases, and the like). The reader(s) 252 may be scanners, barcode scanners, RFID readers, magnetic strip readers, proximity card readers, or any other type of reader capable of reading or scanning indicia.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, invalid reproductions, denomination, type of currency (e.g., which country the currency originates from) and the like. Scanning unit 207 may further be configured to refuse money (either through input slot 209 or withdrawal slot 211) if it cannot be properly recognized or if the currency is deemed to be an invalid reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
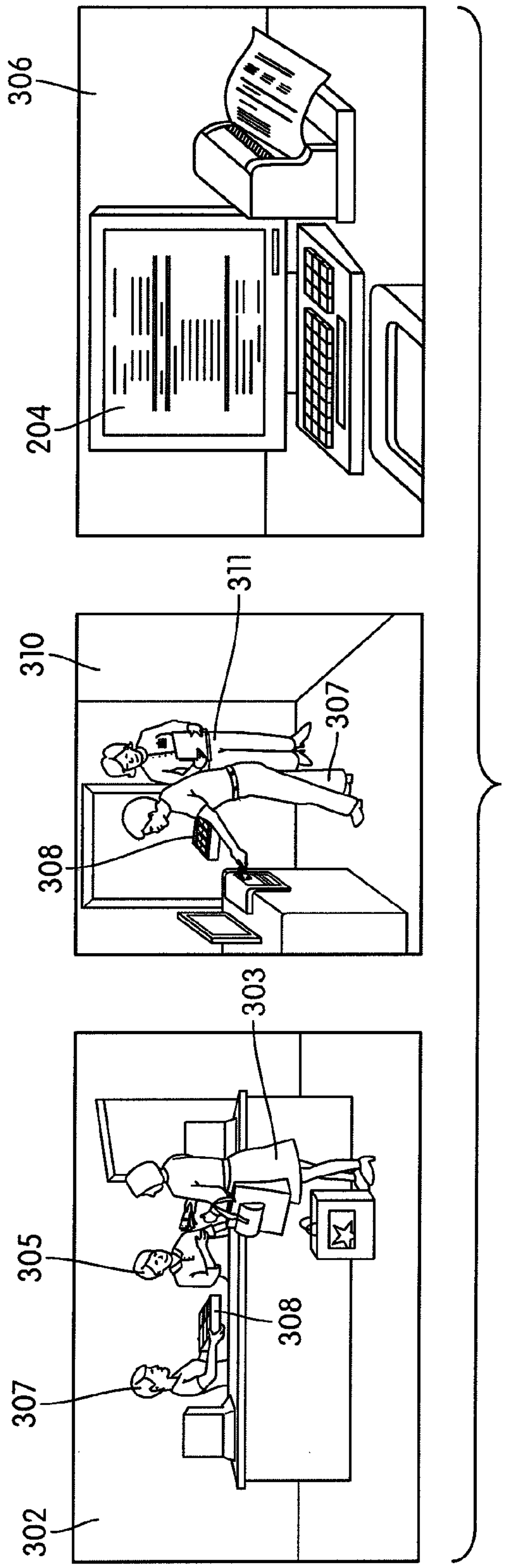
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
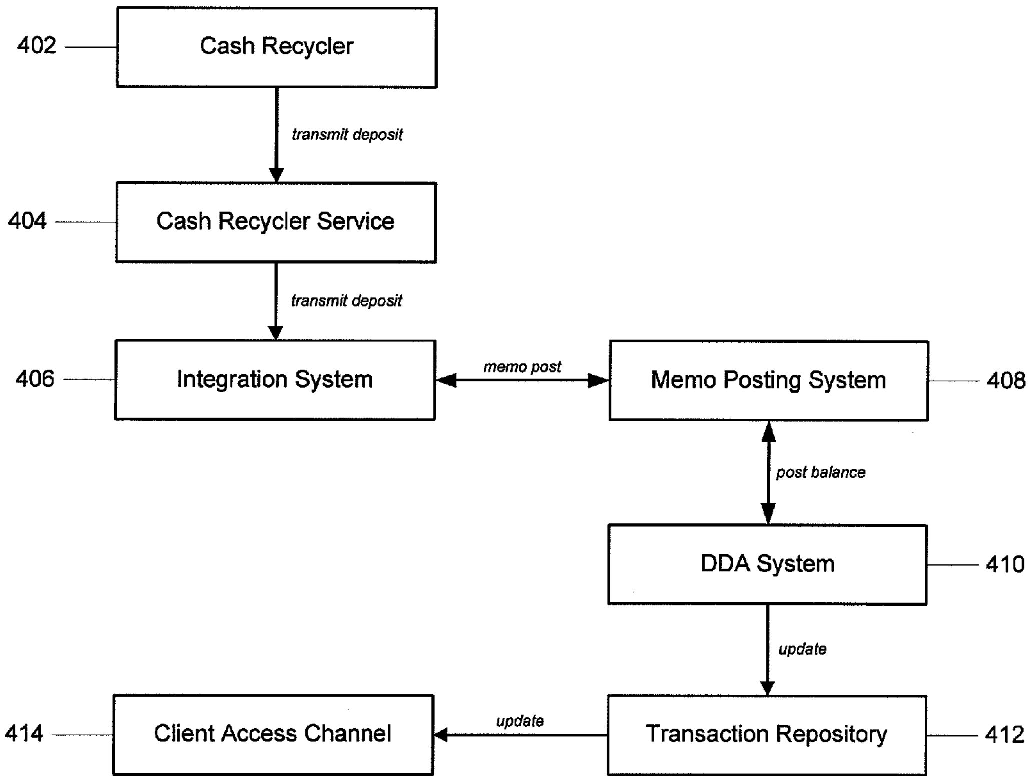
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIGS. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
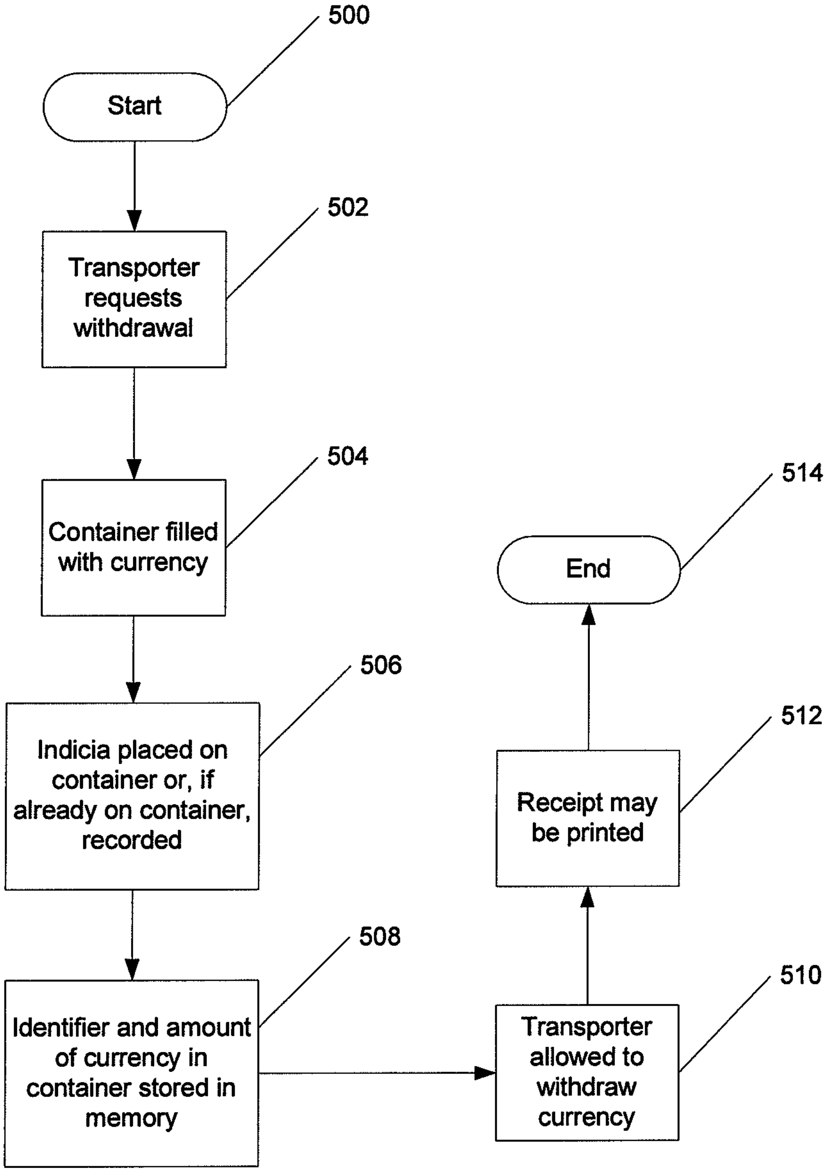
FIG. 5 illustrates an example method for implementing a blind withdrawal from a recycler at a first location.

FIG. 5 illustrates an example method for implementing a blind withdrawal from a recycler. Upon start of the process 500, the user may log on or otherwise obtain authorized access. The user (or transporter) is allowed to request withdrawal for transport 502 from a cash recycler 102, 104, 106. The withdrawal request may be made without having to know the amount to request. The recycler 200 will dispense the correct amount of currency to bring the recycler down to pre-defined levels. A container such as a bag, box, case, and the like may then be filled with the currency to be withdrawn 504. If indicia is not already on the container, indicia may be placed on the container in order to identify it 506. The indicia may be unique. The indicia may be in the form of a barcode, an RFID tag/label, or any other electronically readable or indicia capable of being scanned. The indicia may also be a label, a numeric code, an alphanumeric code, and the like that may be electronically readable or scannable or capable of manual keying into a subsequent system. If indicia is already on the container, information about the indicia (e.g., a barcode number, an RFID identifier, and the like) may be recorded.

The indicia (or information about the indicia) may be stored in memory along with the amount of currency in the container 508. For example, this information may be stored as a record in a database that is stored in a local memory (e.g., 112), in remote memory (e.g., 108), or in memory 158 on a server. The information may also be stored in one location and then transmitted, for example, by network 120 or 140 to another location.

The person transporting the container of currency may then be allowed to withdraw from the recycler the container of currency 510. A receipt, manifest, barcode, or RFID may also be printed for the transaction, if desired 512. The process at the first location can then end 514.

Figure 6:
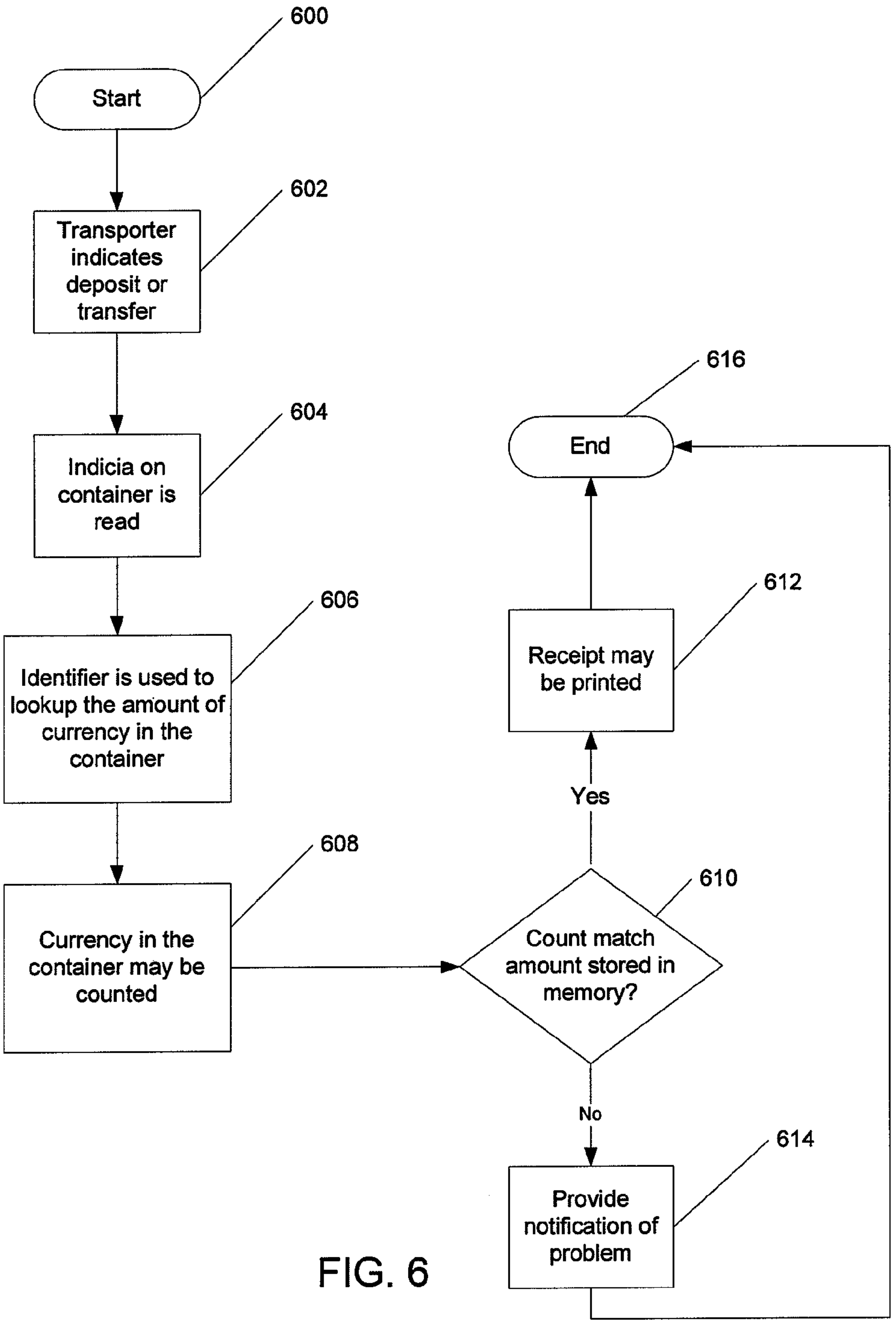
FIG. 6 illustrates an example method for delivering the blind withdrawal to a second location.

FIG. 6 illustrates an example method for delivering the blind withdrawal to a second location. Upon start of the process 600 at a second location to which the container of currency is being delivered, the transporter may indicate that a deposit or transfer of the currency in the container is desired 602. The transporter may do this at a recycler 102, 104, 106. Alternatively, the transporter may convey this to a teller or other person at the delivery location.

Indicia on the container may be read 604. The indicia may be electronically read such as, for example, in the case of a scanning of a barcode, in the electronic reading of an RFID tag/label, or in the scanning and optical character registration of alpha/numeric/alphanumeric text. The indicia may also be manually read off of the container and then subsequently entered into a computer system.

The indicia may then used to lookup the amount of currency in the container 606. For example, the indicia may be used to lookup in the database how much currency is supposed to be in the container.

The currency in the container may then be counted 608. The counted currency can then be compared 610 to the amount of money stored in memory in order to determine whether there are any problems (e.g., there are invalid reproductions of bills, money is missing, and the like). If the count matches the amount of money stored in memory, the transaction was successful and a receipt, manifest, barcode, or RFID may also be printed, if desired 612. The process can then end 616. Alternatively, if the count does not match the amount of money stored in memory, then a notification may be provided in order to alert appropriate personnel or agencies of the problem. Again, a receipt, manifest, barcode, or RFID may also be printed, if desired. The process can then end 616.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method of providing a blind withdrawal of currency for transportation, comprising:

receiving, by a cash recycler that comprises one or more stackers that store and organize currency based on denomination and that further comprises one or more cartridges that store overflow currency for transport, a request to withdraw currency for transport;

calculating, by the cash recycler, an amount of currency to dispense to bring one or more denominations of currency stored in the one or more stackers and the one or more cartridges of the cash recycler to one or more predefined levels;

dispensing, by the cash recycler, the amount of currency into a container having indicia that identifies the container;

storing, by the cash recycler, information associated with the indicia that identifies the container; and after storing the information associated with the indicia that identifies the container, allowing, by the cash recycler, the container to be withdrawn from the cash recycler.

2. The method of claim 1, further comprising:

prior to dispensing the amount of currency into the container, adding, by the cash recycler, and to the container, the indicia that identifies the container.

3. The method of claim 1, wherein the indicia comprises a barcode.

4. The method of claim 1, wherein the indicia comprises a radio frequency identification (RFID) tag.

5. The method of claim 1, wherein the indicia comprises a radio frequency identification (RFID) label.

6. The method of claim 1, wherein the cash recycler is located at a first location, and wherein the container is delivered to a second cash recycler located at a second location different from the first location.

7. The method of claim 6, further comprising:

electronically reading, by the second cash recycler, the indicia that identifies the container;

based on electronically reading the indicia, using, by the second cash recycler, the indicia to look up an expected amount of currency in the container;

counting, by the second cash recycler, the currency in the container to determine a counted amount of currency in the container;

if the counted amount of currency in the container matches the expected amount of currency in the container, printing, by the second cash recycler, a receipt; and if the counted amount of currency in the container does not match the expected amount of currency in the container, providing, by the second cash recycler, a notification.

8. The method of claim 1, wherein the cash recycler is configured to facilitate real-time recognition of funds at a client site where the cash recycler is located.

9. A system, comprising:

a cash recycler, comprising:

a processor;

one or more stackers that store and organize currency based on denomination;

one or more cartridges that store overflow currency for transport; and memory storing instructions that, when executed by the processor, cause the cash recycler to:

receive a request to withdraw currency for transport;

calculate an amount of currency to dispense to bring one or more denominations of currency stored in the one or more stackers and the one or more cartridges of the cash recycler to one or more predefined levels;

dispense the amount of currency into a container having indicia that identifies the container;

store information associated with the indicia that identifies the container; and after storing the information associated with the indicia that identifies the container, allow the container to be withdrawn from the cash recycler.

10. The system of claim 9, wherein the memory stores additional instructions that, when executed by the processor, further cause the cash recycler to:

prior to dispensing the amount of currency into the container, add, to the container, the indicia that identifies the container.

11. The system of claim 9, wherein the indicia comprises a barcode.

12. The system of claim 9, wherein the indicia comprises a radio frequency identification (RFID) tag.

13. The system of claim 9, wherein the indicia comprises a radio frequency identification (RFID) label.

14. The system of claim 9, wherein the cash recycler is located at a first location, wherein the system further comprises a second cash recycler located at a second location different from the first location, and wherein the container is delivered to the second cash recycler.

15. The system of claim 14, wherein the second cash recycler comprises a second processor and second memory storing instructions that, when executed by the second processor, cause the second cash recycler to:

electronically read the indicia that identifies the container;

based on electronically reading the indicia, use the indicia to look up an expected amount of currency in the container;

count the currency in the container to determine a counted amount of currency in the container;

if the counted amount of currency in the container matches the expected amount of currency in the container, print a receipt; and if the counted amount of currency in the container does not match the expected amount of currency in the container, provide a notification.

16. The system of claim 9, wherein the cash recycler is configured to facilitate real-time recognition of funds at a client site where the cash recycler is located.

* * * * *